United States Patent [19]

DeMarco

[11] Patent Number: 4,718,924
[45] Date of Patent: Jan. 12, 1988

[54] TWO COMPARTMENT FOUR STAGE INDUSTRIAL DUST COLLECTOR

[76] Inventor: Thomas M. DeMarco, 5815 N. Cicero, Chicago, Ill. 60646

[21] Appl. No.: 868,695

[22] Filed: May 30, 1986

[51] Int. Cl.4 .............................................. B01D 46/04
[52] U.S. Cl. ...................................... 55/302; 55/337; 55/345; 55/398; 55/468; 55/DIG. 3
[58] Field of Search .................. 55/302, 337, 345–349, 55/467, 468, 398, 442, DIG. 3

[56] References Cited

U.S. PATENT DOCUMENTS

| | | | |
|---|---|---|---|
| 2,720,278 | 10/1955 | Wiley | 55/442 X |
| 3,653,190 | 4/1972 | Lee et al. | 55/302 |
| 3,842,461 | 10/1974 | Wurster | 55/467 X |
| 3,877,902 | 4/1975 | Eriksson et al. | 55/337 |
| 3,951,623 | 4/1976 | Furstenberg | 55/302 X |
| 4,007,026 | 2/1977 | Groh | 55/302 |
| 4,036,614 | 7/1977 | De Marco | 55/467 X |
| 4,099,937 | 7/1978 | Ufken et al. | 55/337 X |
| 4,272,258 | 6/1981 | Shifflett | 55/52 |
| 4,443,235 | 4/1984 | Brenholt et al. | 55/337 X |
| 4,504,292 | 3/1985 | Vohringer | 55/337 X |

OTHER PUBLICATIONS

"Hi Vac" National Foundry Equipment Co. publication.

*Primary Examiner*—Charles Hart
*Attorney, Agent, or Firm*—Jeffrey M. Morris, Ltd.

[57] ABSTRACT

A specially arranged, two compartment, four stage industrial dust collector is provided which is efficient, effective, and economical. The first compartment has a lower chamber which contains a cyclone and an upper chamber which contains a downstream spiral baffle or rings to remove larger particulates of dust. The second compartment has an annular upper chamber with a special arrangement of overhead nozzles for downward air flow to remove particulates of dust by kinetic energy and a lower chamber containing filters for lateral and upward air flow to filter the remaining particulates of dust.

18 Claims, 5 Drawing Figures

TWO COMPARTMENT FOUR STAGE INDUSTRIAL DUST COLLECTOR

BACKGROUND OF THE INVENTION

This invention pertains to machines for removing dry and wet liquid particulates, and more particularly, to a vacuum cleaner loader or conveyor collector.

In industry, voluminous amounts of particulate matter, debris, and waste are emitted during machining, foundry, milling, shipment, warehousing, assembling, fabricating, and other manufacturing operations. Particulates of dust emitted during a manufacturing operation can include metal slivers, plastic chips, wood shavings, dirt, sand, and other debris. Dust accumulates on floors, machines, packaging materials, equipment, food and personnel. Dust is carried and circulated in the air and can be injurious to the health and safety of operating personnel and other on site employees. Dust can damage, erode, and adversely effect the efficiency and operability of equipment. It can also create a fire hazard and cause explosions in some situations, such as in grain elevators. Voluminous amounts of dust can pollute the atmosphere. Dust may also impair the quality of the products manufactured.

Dust emissions are not only dangerous and troublesome, but are particularly aggravating and grievous where relatively dust-free conditions and sterile environments are required, such as in medical supply houses, the electronics industry, and in food-processing plants.

Over the years a variety of industrial dust collectors and other equipment have been suggested for removing industrial dust and debris and for other purposes. Typifying these industrial dust collectors and equipemnt are those found in U.S. Pat. Nos. 485,915, 795,412, 2,276,805, 2,372,316, 2,496,180, 2,604,956, 3,320,727, 3,485,671, 3,541,631, 3,554,520, 3,577,705, 3,608,283, 3,650,420, 3,717,901, 3,731,464, 3,780,502, 3,955,236, 3,970,489, 4,032,424, 4,062,664, 4,111,670, 4,174,206, and 4,224,043. These prior art dust collectors and equipment have met with varying degrees of success.

SUMMARY OF THE INVENTION

An improved industrial dust collector is provided to remove particulate matter, debris and waste from industrial plants and other locations. Advantageously, the novel industrial dust collector is efficient, effective and safe. It can also be portable and accommodate standard size bins and hoppers.

To this end, the novel two compartment four stage industrial dust collector is provided with a first or solids-gas separation compartment to remove larger particulates of dust and a second or filtering compartment to substantially remove the remaining particulates of dust. The solids-gas separation compartment preferably has a first or tangential cyclone separation stage and a second or deflector stage with at least one overhead deflector. In one embodiment, the deflector takes the form of a spiral baffle. In another embodiment, the deflector takes the form of parallel annular baffles or rings.

The second filtering compartment has a second or separation stage of at least one and preferably a set of 2 to 4 canisters with tubular filters therein. And additionally, said second compartment comprises a first or separation stage of overhead nozzles or ports which are arranged in a flow pattern, such as in a circular array, and are provided to direct the dusty gas stream downwardly and about the outside of the tubular filters. One or more air injectors can be provided to periodically clean the tubular filters. In the preferred form, the filtering compartment has a power-operated discharge door to discharge the collected dust into the bin of the adjacent solids-gas separating compartment.

As used in the patent application, the term "dust" means particulate matter, debris and waste.

The terms "dedust" and "dedusted" as used herein means removing a substantial amount of dust.

A more detailed explanation of the invention is provided in the following description and appended claims taken in conjunction with the accompanying drawings.

DETAILED DESCRIPTION OF THE PREFERRED EMBODIMENTS

Figure 1:
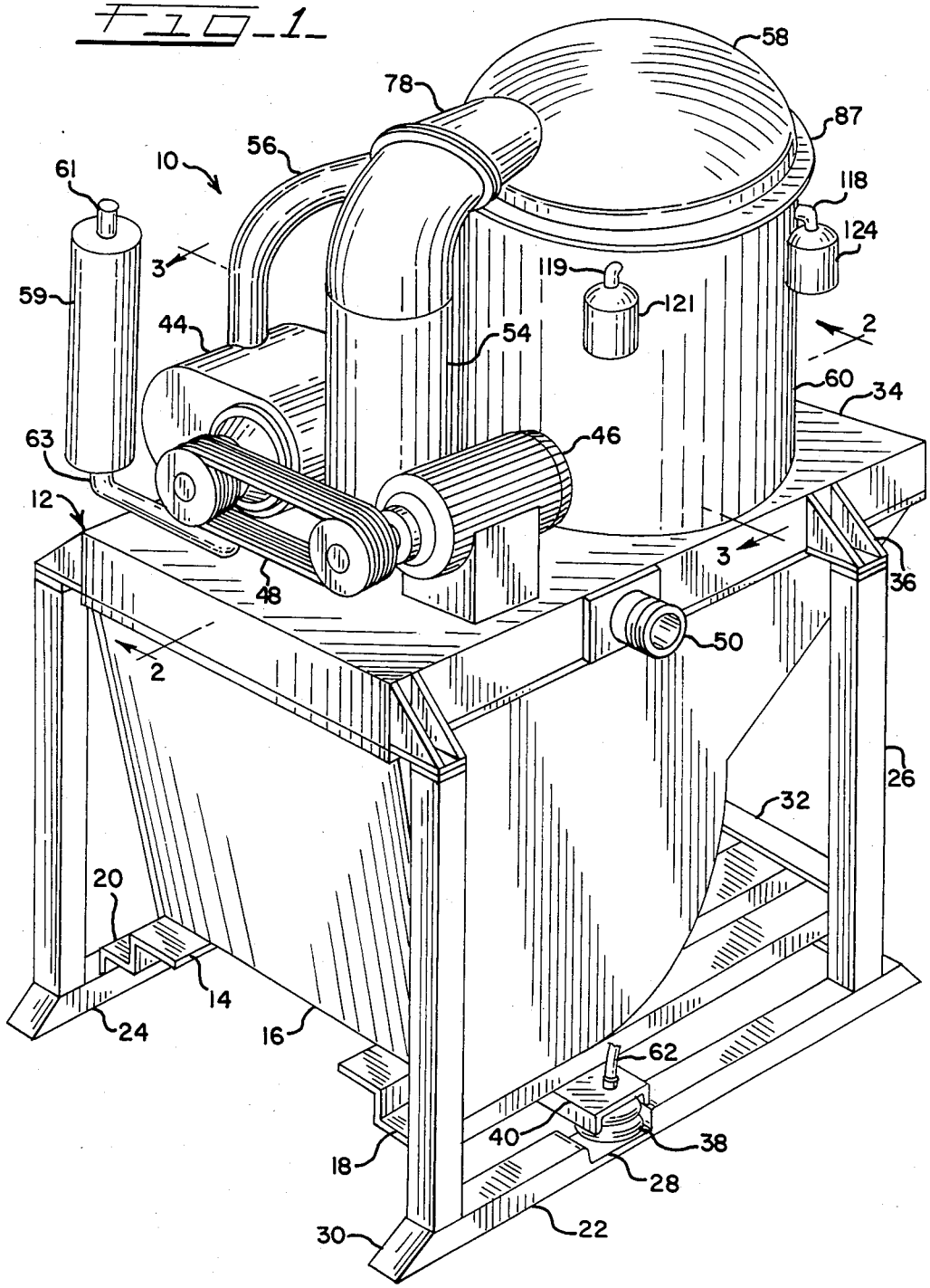
FIG. 1 is a perspective view of a two compartment industrial dust collector in accordance with the principles of the present invention.

Referring to FIG. 1, two compartment, four stage, industrial dust collector 10 provides a heavy-duty vacuum-operated machine for efficiently removing, effectively collecting, and safely disposing of particulate matter, debris, and waste. The industrial dust collector can be made of steel or other metal. Other suitable materials can be used.

The industrial dust collector has a frame assembly 12 which comprises channels 22, 24, 26, and 40 which provides a cradle for receiving a bin or hopper 16 such as a standard 27 cubic foot end dump hopper. The frame assembly and hopper can be equipped with forklift-channels 14 for receiving and being moved by tines of a forklift truck. The frame assembly has support members or skids 22 and 24 which provide a base and four vertical posts 26 and 26a which are securely connected to and extend upwardly from the ends or corners of each support member. The support members are parallel, extend vertically and have a bellow-support pad 28 and feet 30. A transverse support bar 32 extends between posts 26a. An upper, horizontally disposed support platform 34 with four support arms 36 is securely connected to, positioned upon, and extends laterally between the tops of posts 26 and 26a, two pneumatically-operated expansion bellows 38 are positioned on the bellows support pads of the base, near the posts and under a bellows-raisable channel and transverse bar 40 under bin 16 to move the bin in a vertical direction flush into sealing engagement against a gasket or seal 42 (FIGS. 2 and 3) on the underside of the support platform. Wheels or casters (not shown) can be mounted on the underside or sides of the base 22 and 24 to enable the frame assembly to be towable, mobile, and portable.

An air blower, vacuum pump, or fan 44 (FIG. 1) and motor 46 are mounted on a support surface, such as the support platform 34. The air blower is operatively connected to and driven by the motor by drive belts 48. The air blower (vacuum pump) creates a vacuum (suction) to draw dust and direct influent dusty air (air laden with particulates of dust) through an inlet conduit 50 into a first compartment which comprises two stages: a first or tangential cyclone stage 52 and a second or (FIG. 2) solids-gas separation stack stage 65. The cyclone stage comprises a relatively short cylinder and the stock stage comprises a relatively elongated 4-cylinder. The air blower inlet is connected by an overhead blower line and conduit 56 (FIG. 1) to outlet 114 of the upper chamber of filtering compartment 60. The air lift bellows 38 are activated by means of a manually operated hand valve with compressed air being supplied for inflation from an external source or a separate optional air compressor mounted on the frame assembly 12. A muffler 59 with an overhead discharge outlet 61 is connected to the air blower by a blower-discharge conduit 63. An automatic shutoff control panel (not shown) can be mounted on the support platform and connected to a sensor and limit switch in the bin to automatically shut off the air blower or motor when the discharged collected dust in the bin has reached a preselected level. A flexible, elongated intake hose, with an optional nozzle, can be connected to the intake conduit 50 and to facilitate collection of the particulate material.

The solids-gas separation compartment 54 (FIG. 2) provides two stages of separation: a lower chamber comprising a first cyclone-stage 64 and an upper chamber comprising a second deflector-stage 65. The lower chamber contains a tangential cyclone 52 with an open bottom or bottom outlet 66 for discharging larger particulates into bin 16 and an open top or top outlet 67 for discharging the remaining entrained particulates and air into the upper chamber. The upper chamber provides an upper deflector section with a cylindrical upright wall 68. A spiral or helical interrupting baffle 69 attached to wall 68 spirals upwardly in the upper chamber (second stage). The spiral interrupting baffle extends above and cooperates with the tangential cyclone below to make a gross cut and remove the larger particulates of dust which have not fallen into the bin so as to partially dedust the influent dusty air. It has been unexpectedly and surprisingly found that the spiral baffle removes a greater amount of large particulates of dust than just a cyclone alone. Indeed, a large amount of particulates collect on the bottom side of said baffle.

Figure 5:
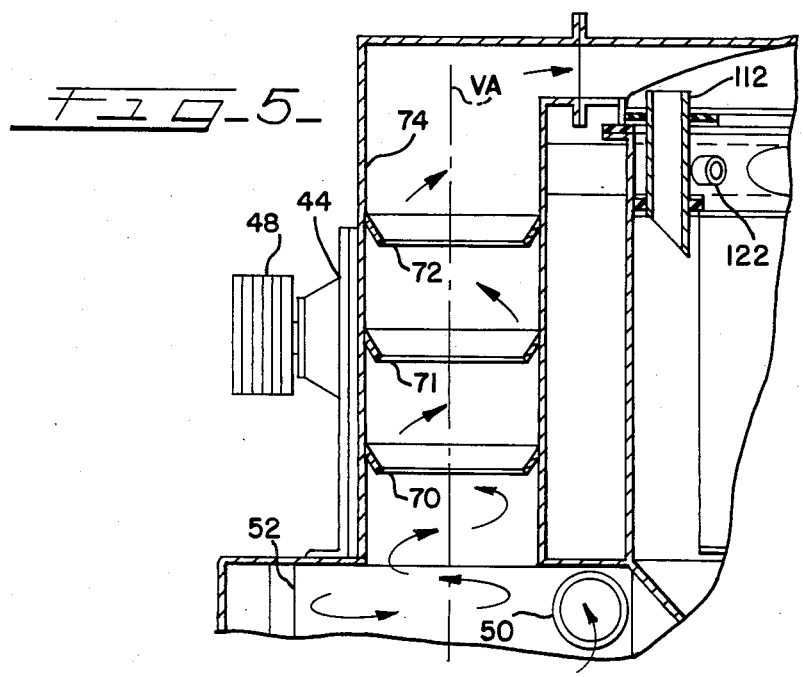
FIG. 5 is a fragmentary cross-sectional view of another two compartment industrial dust collector in accordance with principles of the present invention, with rings or annular baffles in the upper deflector separation chamber of the solids-gas separation compartment.

In the embodiment of FIG. 5, parallel horizonal rings 70, 71, 72 which define a set of annular interrupting baffles are concentrically positioned about the vertical axis VA of the upper chamber deflector section (upper second stage) 74 of the solids-gas separation compartment above the tangential cyclone 52, instead of or in combination with the spiral baffle 69 to make a gross cut and remove larger particles of dust so as to partially dedust the influent dusty air. The rings can be connected to the walls of the chamber and can be connected and spaced from each other by rods. It has been unexpectedly and surprisingly found that the rings or annular baffles are almost as good as the spiral baffle in removing a large amount of the dust particulates.

The partially dedusted air exits the first compartment through an outlet 76 (FIG. 2) near the top of the first compartment. An intermediate conduit and passageway 78 (FIGS. 1, 2, and 4) is connected to and communicates with the outlet 76 to the substantially second or filtering compartment 60 to the overhead array of downwardly facing stage ports, slots or nozzles 80 within the dome 131 which is in the filtering compartment 60 for passing, conveying, and injecting the partially dedusted air into the lower filter chamber below.

The second or filtering compartment 60 (FIG. 2) provides two filtering stages; a third and a fourth stage. The second compartment comprises a chamber with a cylindrical upright wall 82 and a slanted frustoconical, annular lower wall portion 84 extending downwardly from the upright wall to provide a discharge opening and chute into bin 16. The second compartment has a horizontal floor comprising a power-operated or air flow operated horizontal discharge valve, flap or door 86 which is mounted on rollers 88 (FIG. 3) and connected by suitable air or hydraulic cylinders powered by an external compressed air tank or a hydraulic pump (not shown). In the preferred embodiment, door 86 (hatch) is horizontal for best results, although in some circumstances it may be desirable to use one or more doors or hatches which are at an angle of inclination. The upper chamber 131 and domed top 58 above the second compartment rests on an outwardly extending, circular flange 87.

Upper chamber 131 comprises a plurality of downwardly facing nozzles 80 for forced downward air flow to remove particulates of dust by kinetic energy and lower chmber 89 comprises a plurality of canister filters 90 for annular and lateral air flow to each filter from the downwardly moving dusty air flow from the nozzles to remove substantially all of the remaining particulates of dust. It has been unexpectedly and surprisingly found that the third or nozzle stage of the second compartment produces superior downward dedusting of the dusty air by virtue of the kinetic energy of the particulate as they leave the nozzles while the cleaner air is drawn laterally into the adjacent filters.

As previously mentioned, the fourth or canister filter stage contains a set of two, and preferably four, filter-canisters 92, 94, 96, and 98 (FIG. 4) which are positioned in a circular array within compartment 60. Each of the canisters contains a vertically positioned, annular V-shaped retainer 102. While the preceding arrangement is preferred for best results, more or less filters can be used, if desired.

Figure 4:
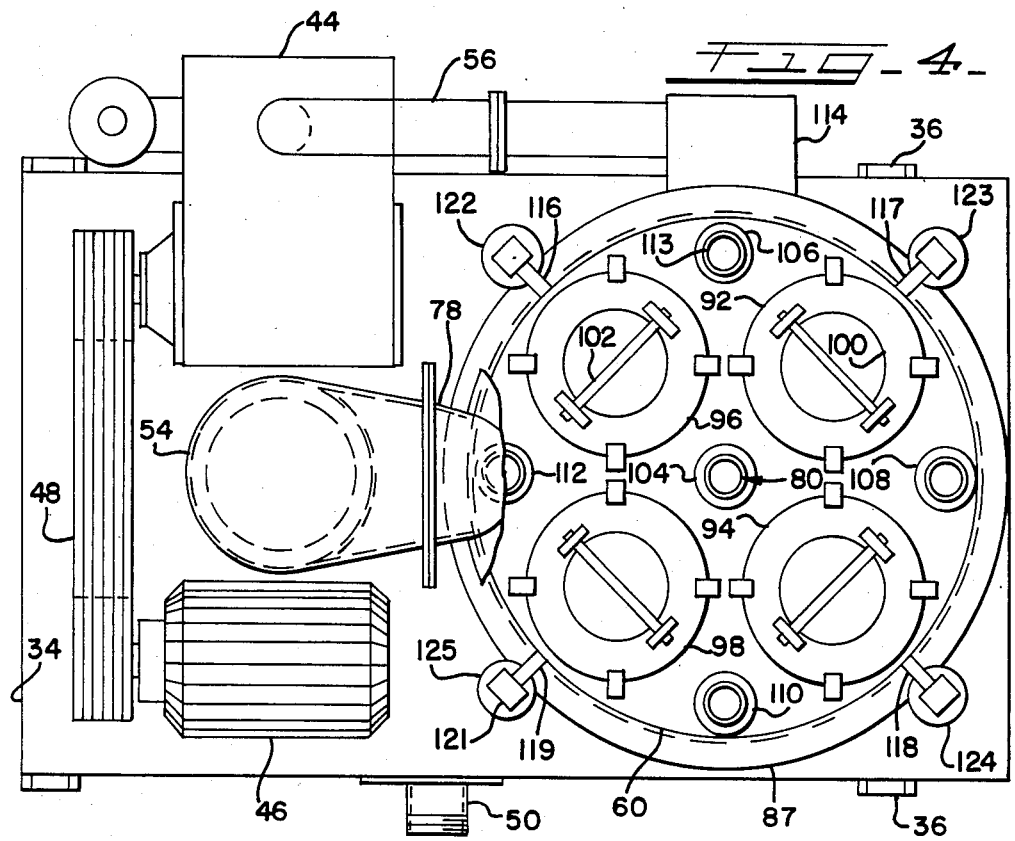
FIG. 4 is a top view of the two compartment industrial dust collector.

As shown in FIG. 4, the downwardly facing overhead nozzles 80 include a central nozzle 104, positioned in the center of the dome along the vertical axis of the filter chamber, and a circular set, array, or series of four nozzles 106, 108, 110, and 112, radially and circumferentially surround the central nozzle. While the above arrangement of nozzles are preferred for best results, a different arrangement of nozzles, or more or less or ports can be used, if desired. The nozzles are fluidly sealed by o-rings or seals 113. The downwardly facing overhead nozzles are arranged to cooperate with each other to direct the partially dedusted air downwardly in an annular flow pattern about the outside of the filters, so that the cleaner air will pass laterally and inwardly through the filters while the particulates maintain a downwardly flow due to kinetic energy imparted to them for their settlement on door 86. The filtered air is deflected and drawn upwardly through the centers 130 of the filters through to the clean air chamber 132. The filters remove the fines (minute fine dust particles) and substantially all the remaining particulates of dust in the air stream to produce a substantially dedusted purified air stream.

A discharge outlet conduit 114 is connected to and communicates with the clean air chamber (plenum) 132 of the filtering compartment 60 and conduit 56 to provide an outlet and passageway through which the purified, dedusted and substantially filtered air is drawn into the vacuum suction pump (air blower) and muffler for discharge to the atmosphere or area surrounding the collector.

Reverse impulse filter cleaners comprising air injectors 122, 123, 124, and 125 (FIG. 2 and 4) can be mounted and extend to the interior of the air chamber 132 with conduit nozzles 116, 117, 118, and 119 extending to the center of each respective filter to periodically inject intermittent blasts of clean air upon the inside of the filter to help clean the outside surface of the filters. The injectors are connected by pneumatic tubes or conduits and valves 121 to an air supply source, such as compressed air canister, compressed air tanks, or an auxiliary compressor. In the illustrative embodiment, there is a circular array of four compressed air tanks 122-125 mounted about the exterior surface of the cylindrical upright wall of the filtering compartment 60 and there is a circular set or array of four downwardly facing, overhead air injectors 116-119 positioned above the center of the filters and connected to the compressed air tanks to sequentially inject pulses of compressed air into the center of the tubular filters to shake loose the dust collected, accumulated, or caked on the outside of the filter walls. More or less air injectors and compressed air canisters can be used. While the illustrated arrangement is preferred for best results, a different shaped array of air injectors and/or air canisters can be used, if desired.

Figure 2:
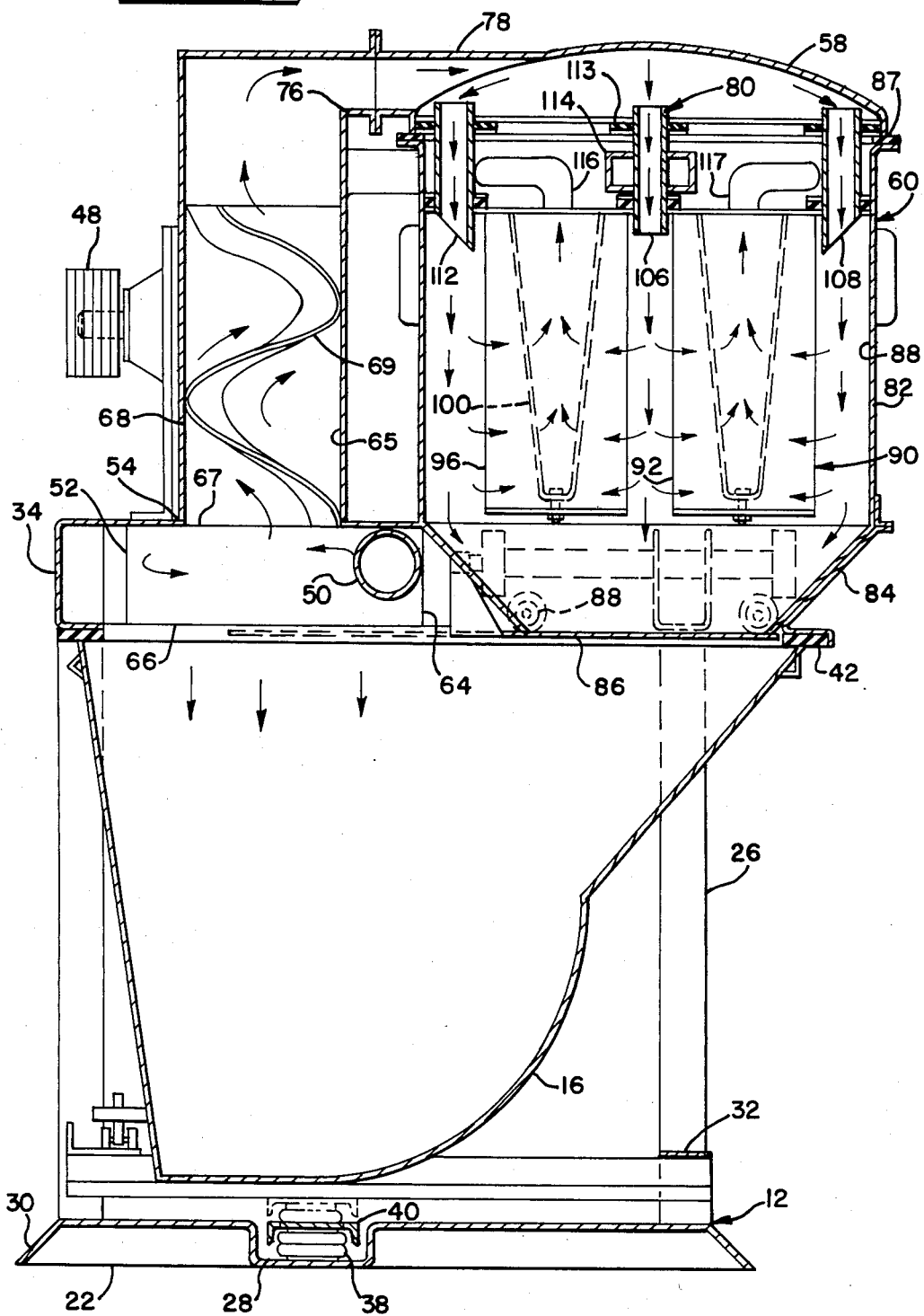
FIG. 2 is a cross-sectional side view of the two compartment industrial dust collector taken substantially along lines 2—2 of FIG. 1.
Figure 3:
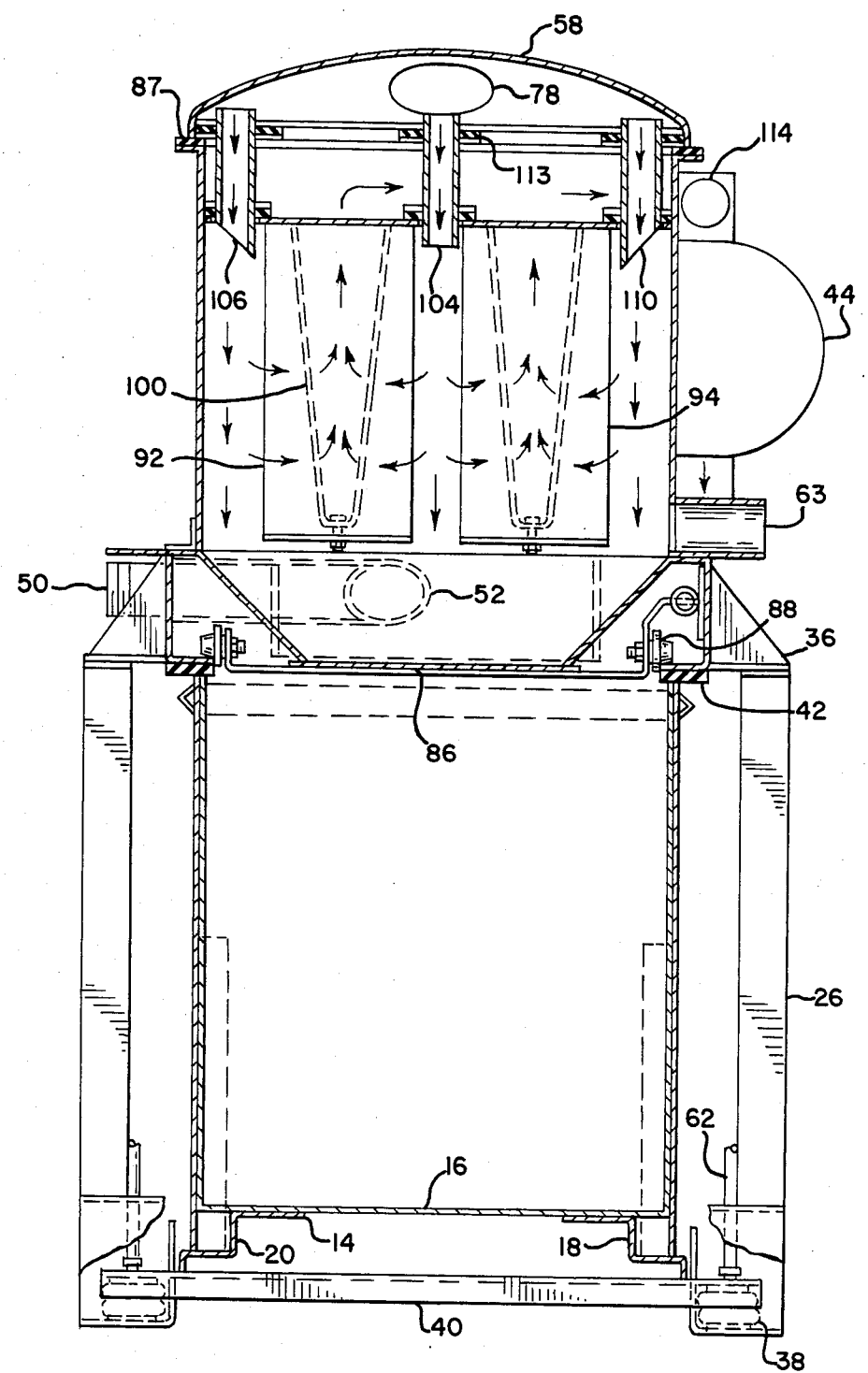
FIG. 3 is a cross-sectional end view of the two compartment industrial dust collector taken substantially along lines 3—3 of FIG. 1.

The removed dust collected and accumulated on the bottom of the filtering compartment is discharged into bin 16 for first compartment when the blower is turned off and the discharge door is opened, as indicated in dotted phantom line in FIG. 2.

In operation, air laden with entrained particulates of debris, waste and other dust is drawn by the blower through the intake conduit 50 into the tangential cyclone 52 in the lower chamber of the solids-gas separation compartment. The cyclone swirls the dusty air tangentially along the inside surface of the chamber and ejects the effluent air upwardly through the upper deflector chamber of the solids-gas separation compartment. In the upper deflector chamber of the solids-gas separation compartment, the spiral baffles or rings will catch the dusty air along its bottom surface which flows in an upward spiral or radial pattern to outlet 76. The baffle or rings cooperates with the cyclone to remove the larger particulates of dust and to substantially decrease the concentration of dust in the air stream. The removed particulates are discharged by gravity downwardly into bin 16 through the bottom outlet 66 of the cyclone chamber.

The partially dedusted air stream is then passed laterally through the intermediate conduit 78 to the domed upper chamber 131 of the filtering compartment, having domed top 58 and is injected forcefully downwardly by the nozzles or ports through to the annular lower chamber of the filtering compartment 60 about the outside surface of the tubular filters 92, 94, 96, and 98. The cleaner air is then passed laterally and radially inwardly through the filters and deflected upwardly through centers of the tubular filters for discharge through the outlet 114 of the filtering compartment. The filters remove the fines and substantially all of the remaining particulates of dust to produce a substantially dust-free air stream. The filtered air is drawn into the vacuum suction pump (air blower) 44 and the muffler 59 for safe discharge to the sourrounding area, environment, or atmosphere.

Among the advantages of the two compartment industrial dust collector are:
1. Improved removal of particulate matter, debris and waste.
2. Better solids-gas separation.
3. Enhanced air purification.
4. Excellent dedusting.
5. Greater efficiency of operation.
6. More economical to manufacture and operate.
7. Easy to use.
8. Effective.
9. Less pressure drop.
10. Quiet zone on bottom of 2nd compartment for dust settlement.
11. Lateral flow of air into filters.
12. Easy to repair.
13. Less maintenance.

Although embodiments of the invention have been shown and described, it is to be understood that various modifications and substitutions, as well as rearrangements of parts, can be made by those skilled in the art without departing from the novel spirit and scope of this invention.

What is claimed is:

1. A two compartment, four stage, industrial dust collector, comprising:
a first solids-gas separating compartment containing solids-gas separator means for removing larger particulates of dust from a dusty gas stream;
an inlet conduit connected to said solids-gas separating compartment for feeding said dusty gas stream to said solids-gas separating compartment;
a second filtering compartment having a filtering chamber and an upper chamber in communication with said filtering chamber, said filtering chamber having at least one filter for substantially filtering said dusty gas stream, and said upper chamber having at least one downwardly facing nozzle for injecting said dusty gas stream substantially downwardly with sufficient kinetic energy to remove a substantial amount of particulates of dust from said dusty gas stream before said dusty gas stream is filtered by said filter in said filtering chamber;
intermediate conduit means for conveying said gas stream from said first solids-gas separating compartment to said second filtering compartment; and
a discharge conduit connected to said filtering compartment for discharging said filtered gas stream.

2. A two compartment, four stage, industrial dust collector, comprising:
a first solids-gas separting compartment containing solids-gas separator means comprising a tangential cyclone for removing larger particulates of dust from a dusty gas stream;
an inlet conduit connected to said first solids-gas separating compartment for feeding said dusty gas stream to said first solids-gas separating compartment;
a second filtering compartment containing filtering means comprising a set of tubular filters for substantially removing the remaining particulates of dust from said gas stream, said second filtering compartment positioned downstream and communicating with said first solids-gas separating compartment;

a discharge conduit connected to said second filtering compartment for discharging said filtered gas stream;

compressed air tanks; and an array of air injectors, said air injectors being operatively connected to said compressed air tanks and positioned above the center of said tubular filters for sequentially injecting pulses of compressed air into the center of said tubular filter to help clean said tubular filters.

3. A two compartment, four stage, industrial dust collector, comprising:

a first solids-gas separating compartment containing solids-gas separator means comprising a tangential cyclone for removing larger particulates of dust from a dusty gas stream;

an inlet conduit connected to said solids-gas separating compartment for feeding said dusty gas stream to said solids-gas separating compartment;

a second filtering compartment containing filtering means comprising a set of tubular filters for substantially removing the remaing particulates of dust from said gas stream, said filtering means further including an upper chamber with a plurality of downwardly facing nozzles for injecting said dusty gas stream substantially downwardly with sufficient kinetic energy to remove a substantial amount of particulates of dust from said dusty gas stream before said dusty gas stream enters and passes through said tubular filters;

intermediate conduit means for conveying said gas stream from said solids-gas separating compartment to said filtering compartment; and a discharge conduit connected to said filtering compartment for discharging said filtered gas stream.

4. A two compartment, four stage, industrial dust collector, comprising:

a first solids-gas separating compartment containing solids-gas separator means comprising a tangential cyclone for removing larger particulates of dust from a dusty gas stream;

an inlet conduit connected to said solids-gas separating compartment for feeding said dusty gas stream to said solids-gas separating compartment;

a second filtering compartment containing filtering means comprising a set of tubular filters for substantially removing the remaining particulates of dust from said gas stream;

intermediate conduit means for conveying said gas stream from said solids-gas separating compartment to said filtering compartment;

a discharge conduit connected to said filtering compartment for discharging said filtered gas stream;

compressed air tanks; and an array of air injectors, said air injectors being operatively connecetd to said compressed air tanks and positioned above the center of said tubualr filters for sequentially injecting pulses of compressed air into the center of said tubular filter to help clean said tubular filters.

5. A two compartment, four stage, industrial dust collector in accordance with claim 4 wherein said second filtering compartment has a power-operated discharge door.

6. A two compartment, four stage, industrial dust collector in accordance with claim 4 wherein said solids-gas separation means comprises a substantially stationary spiral baffle positioned above said tangential cyclone.

7. A two compartment, four stage, industrial dust collector in accordance with claim 4 wherein said solids-gas separator means comprises at least one substantial cyclone.

8. A two compartment industrial dust collector, comprising:

a bin;

a frame assembly providing a cradle for slidably receiving said bin, said frame assembly having a base, posts extending upwardly from said base, and a support platform secured to, positioned upon, and extending laterally between said posts;

a solids-gas separation stage compartment having a lower separation chamber and an upper deflector separation stage chamber extending substantially upwardly from said suport platform, said solids-gas separation compartment containing a tangential cyclone in said lower separation stage chamber and a spiral baffle spiraling substantially upwardly in said upper deflector separation stage chamber, said spiral baffle extending above and cooperating with said cyclone below for partially dedusting a dust-laden stream of influent dusty air;

an inlet conduit connected to and communicating with said tangential cyclone;

a vacuum pump mounted upon said support platform for drawing said influent dusty air through said inlet conduit into said tangential cyclone;

a filter compartment extending substantially upwardly from said support platform, said filtering compartment having an annular upper chamber and a lower filter chamber;

said annular upper chamber of said filter compartment having an overhead array of downwardly facing nozzles, said nozzles comprising a central nozzle and a substantially circular set of nozzles radially surrounding and cooperating with said central nozzle to direct said partially dedusted air in a downwardly annular flow pattern about said filters in said lower chamber;

said lower filter compartment containing a set of tubular filters spaced along side of each other for filtering said partially dedusted stream of air as said air moves laterally and radially inwardly through said filters to provide a substantial dedusted, upwardly flowing, purified stream of air;

an intermediate conduit connected to and communicating with said solids-gas separation compartment and said nozzles for conveying said partially dedusted air from said solids-gas separation chamber to said nozzles; and an outlet conduit connected to and communicating with said filtering compartment and said vacuum pump for passing said purified air from said filter compartment into the atmosphere.

9. A two compartment industrial dust collector in accordance with claim 8 wherein said spiral baffle comprises a helical baffle.

10. A two compartment industrial dust collector in accordance with claim 8 including pneumatic bellows positioned upon said base for moving said bin into sealing engagement against said support platform.

11. A two compartment industrial dust collector in accordance with claim 8 including injectors operatively connected to said filtering compartment for periodically injecting intermittent blasts of air upon said filters to help clean said filters.

12. A two compartment industrial dust collector in accordance with claim 8 wherein said filtering compartment has a floor comprising discharging means positioned above said bin for discharging said removed dust into said bin.

13. A two compartment industrial dust collector in accordance with claim 12 including power-operated drive means operatively connected to said discharging means for automatically moving said discharging means from a normally closed postion to an open discharge position and vice versa.

14. A two compartment industrial dust collector, comprising:
   a bin;
   a frame assembly providing a cradle for slideably receiving said bin, said frame assembly having a base, posts extending upwardly from said base, and a support platform secured to, positioned upon and extending laterally between said posts;
   a solids-gas separation compartment having a lower separation chamber and an upper deflector chamber extending substantially upwardly from said support platform, said upper deflector chamber defining a vertical axis, said solids-gas separation compartment containing a tangential cyclone in said lower chamber and a substantially parallel set of horizontal annular baffles positioned substantially concentrically about said vertical axis in said upper deflector chamber and said annular baffles being positioned above and cooperating with said cyclone for partially dedusting a dust-laden stream of influent dusty air;
   an inlet conduit connected to and communicating with said tangential cyclone;
   a vacuum pump mounted upon said support platform for drawing said influent dusty air through said inlet conduit into said tangential cyclone;
   a filter compartment extending substantially upwardly from said support platform, said filtering compartment having an annular upper chamber and a lower filter chamber
   said annular upper chamber of said filter compartment having an overhead array of downwardly facing nozzles, said nozzles comprising a central nozzle and a substantially circular set of nozzles radially surrounding and cooperating with said central nozzle to direct said parallel dedusted air in a downwardly annular flow pattern about said filters in said lower chamber;
   said lower filter chamber containing a set of tubular filters spaced along side of each other for filtering said partially dedusted stream of air as said air moves laterally through said filters to provided a substantially dedusted, upwardly flowing, purified stream of air;
   an intermediate conduit connected to and communicating with said solids-gas separation compartment and said nozzles for conveying said partially dedusted air from said solids-gas separation compartment to said nozzles; and
   an outlet conduit connected to and communicating with said filtering compartment and said vacuum pump for passing said purified air from said filter compartment into the atmosphere.

15. A two compartment industrial dust collector in accordance with claim 14 including pneumatic bellows positioned upon said base for moving said bin into sealing engagement against said support platform.

16. A two compartment industrial dust collector in accordance with claim 14 including a set of injectors operatively connected to said filter compartment for periodically injecting intermittent blasts of air upon said filters to help clean said filters.

17. A two compartment industrial dust collector in accordance with claim 14 wherein said filter compartment has a floor comprising a discharging means positioned above said bin for discharging said removed dust.

18. A two compartment industrial dust collector in accordance with claim 17 including power-operated drive means operatively connected to said discharging means for automatically moving said discharging means from a normally closed position to an open discharge position and vice versa.

* * * * *